May 2, 1944. A. A. SCOTT, JR., ET AL 2,347,972
BUTTON MOLDING APPARATUS
Filed Jan. 7, 1941 10 Sheets-Sheet 2
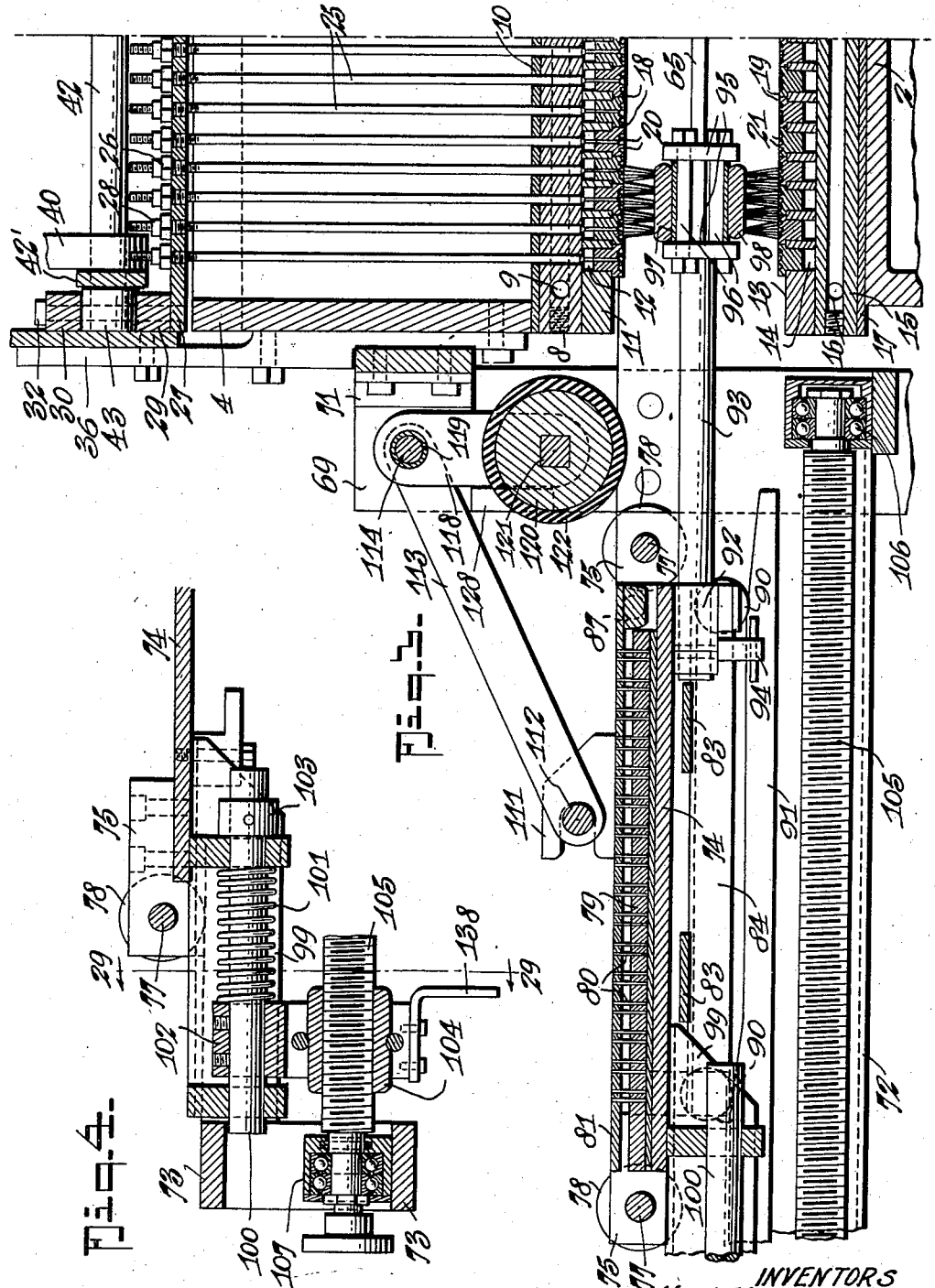
INVENTORS
Hart H. McNaughton.
Alexander A. Scott, Jr.
BY Cyrus Kehr & Sweetser
their ATTORNEYS

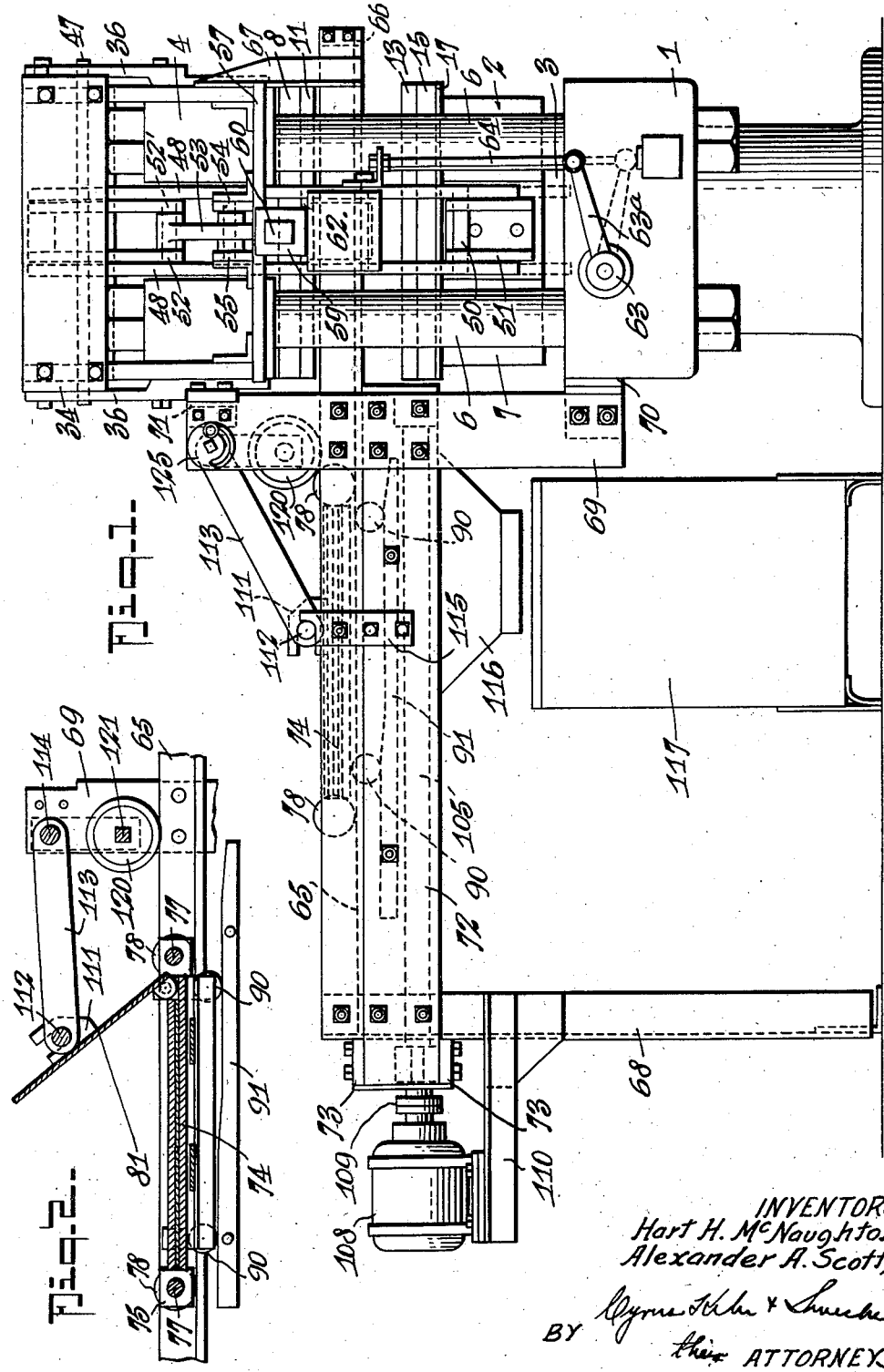

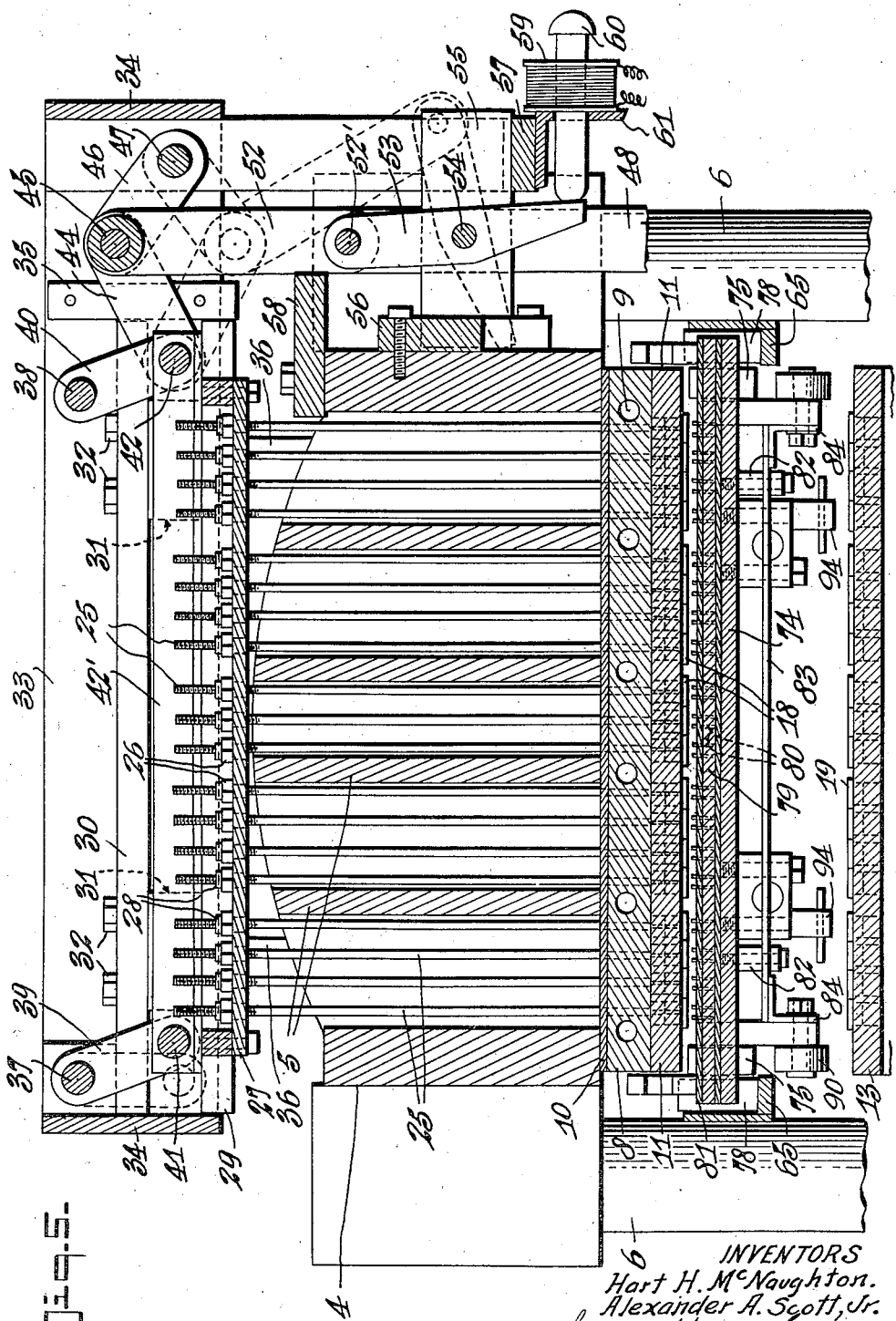

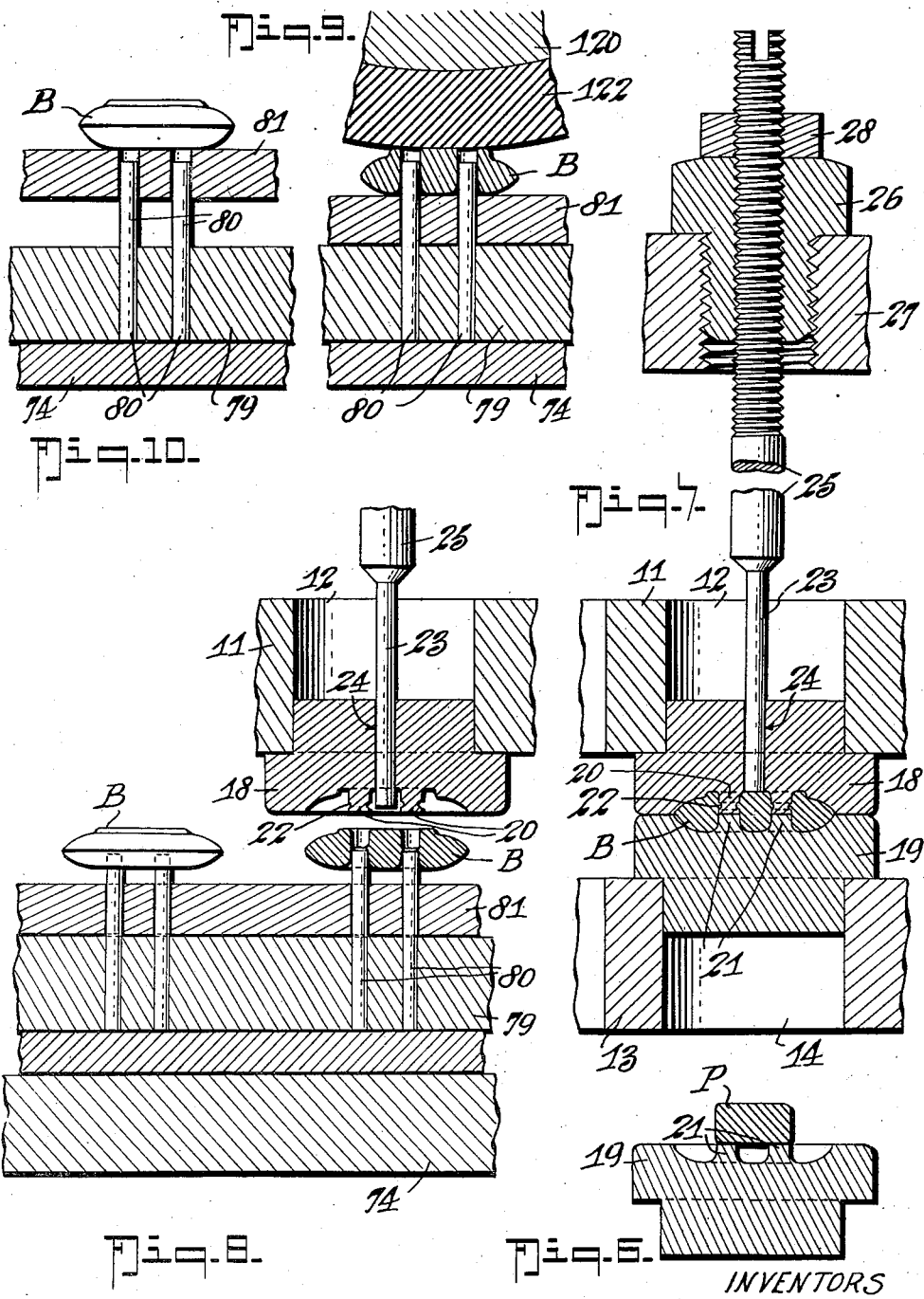

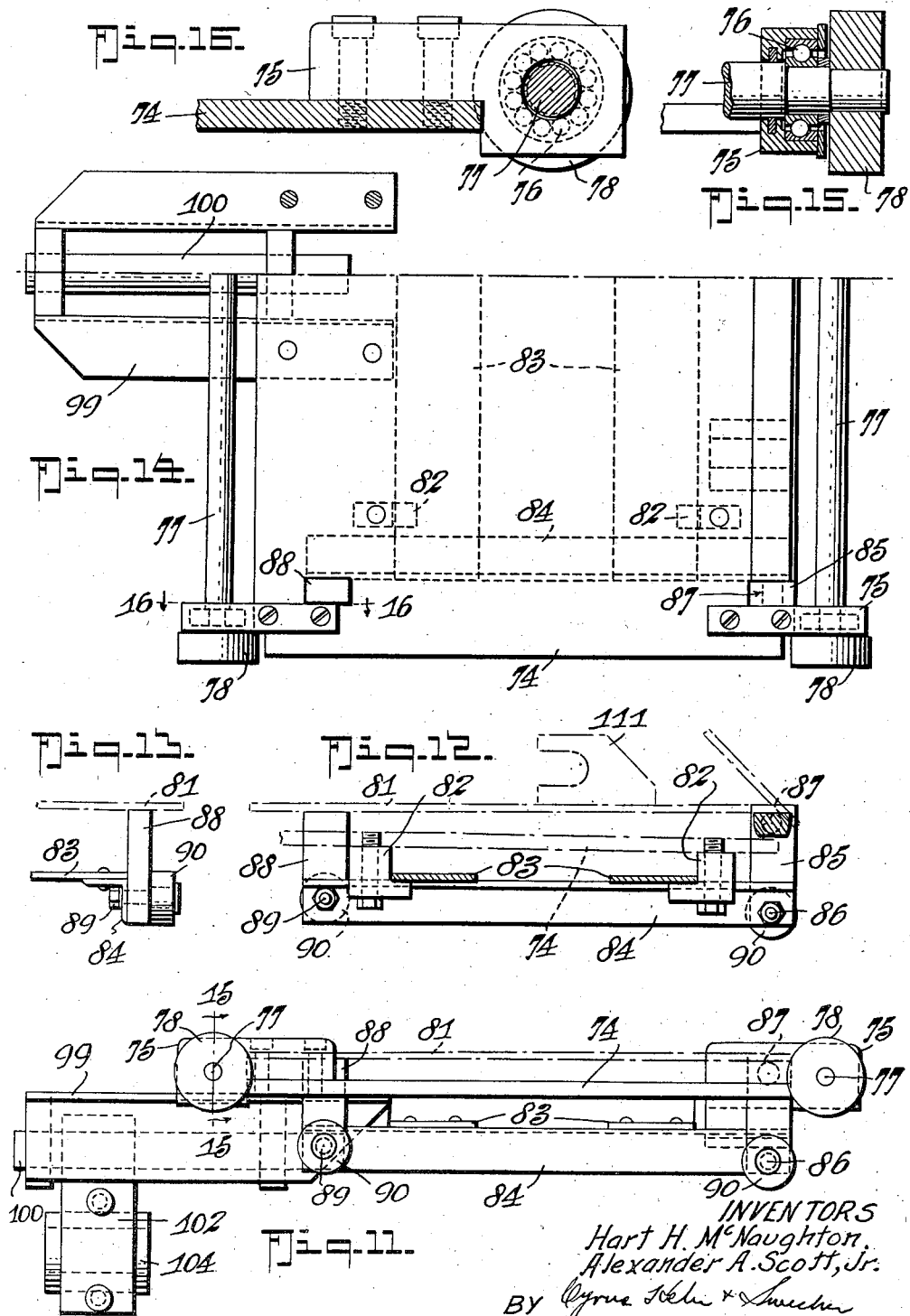

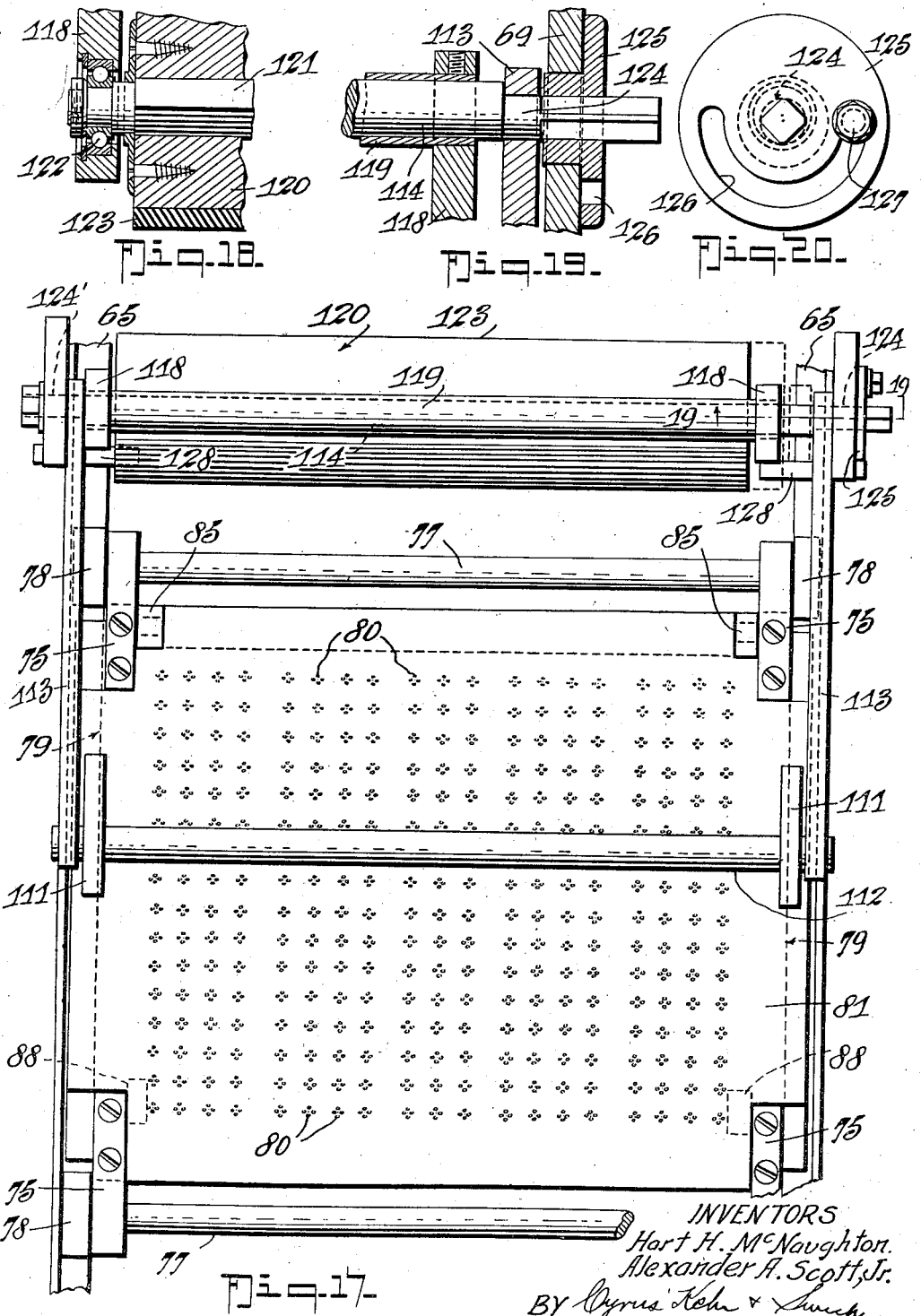

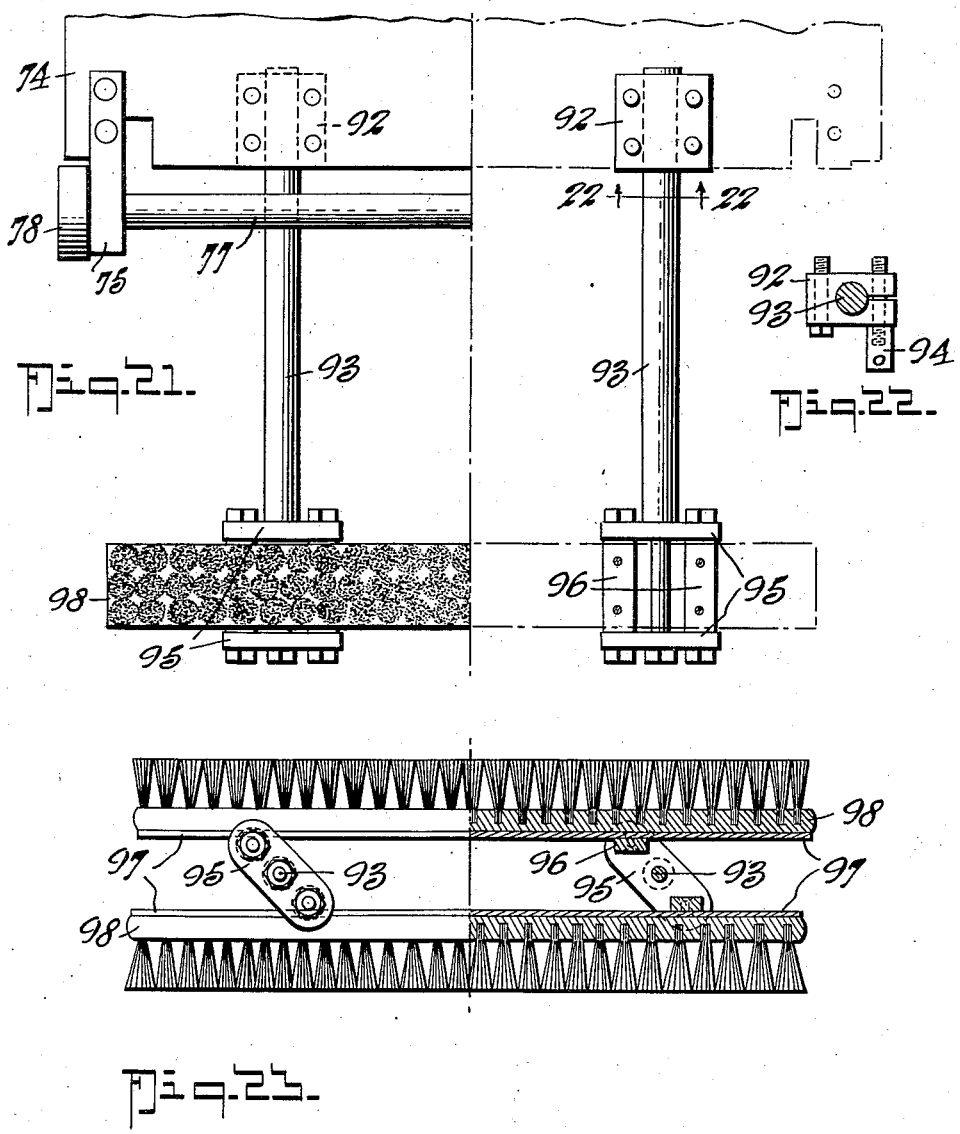

May 2, 1944. A. A. SCOTT, JR., ET AL 2,347,972
BUTTON MOLDING APPARATUS
Filed Jan. 7, 1941 10 Sheets-Sheet 8
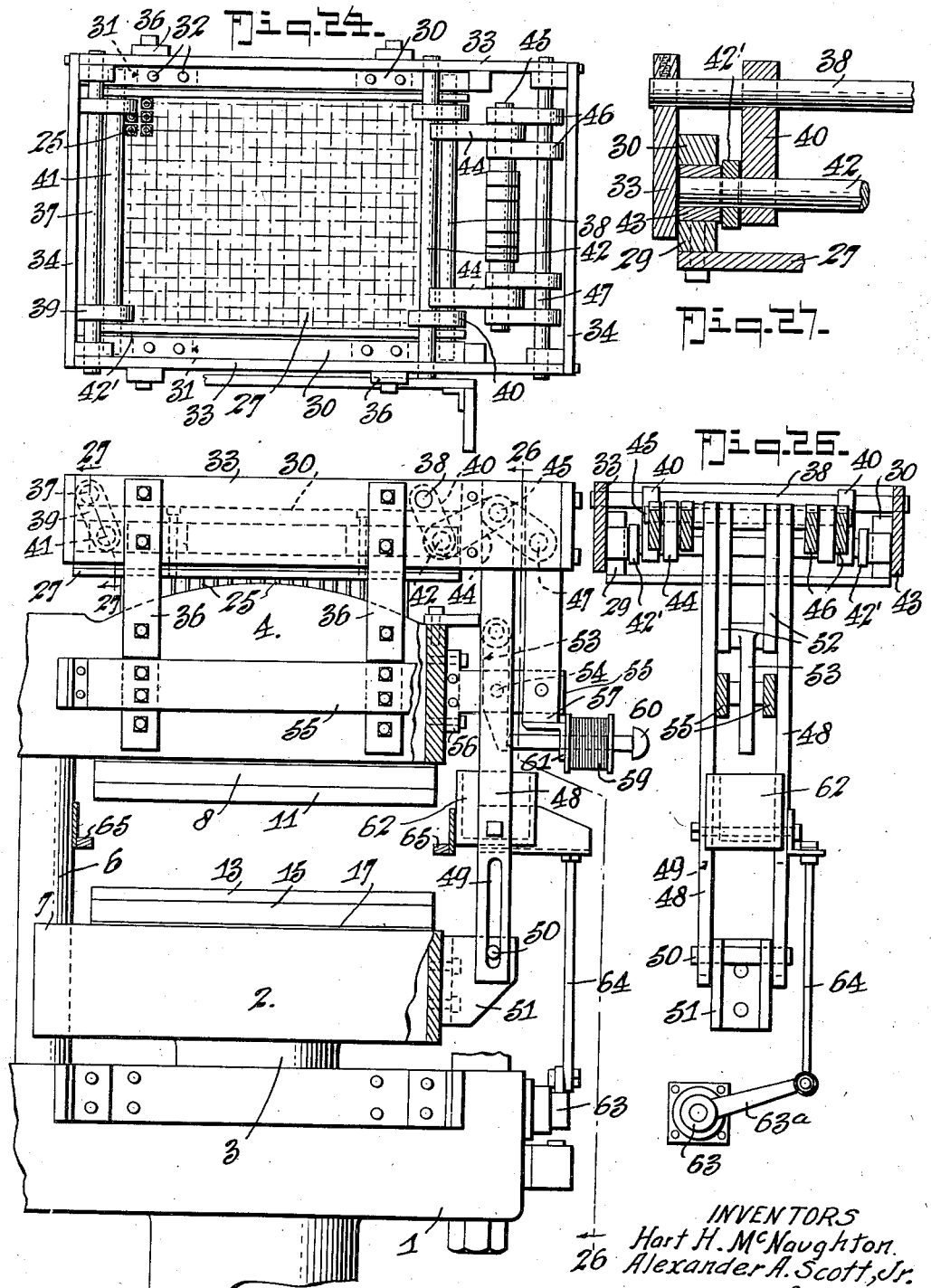

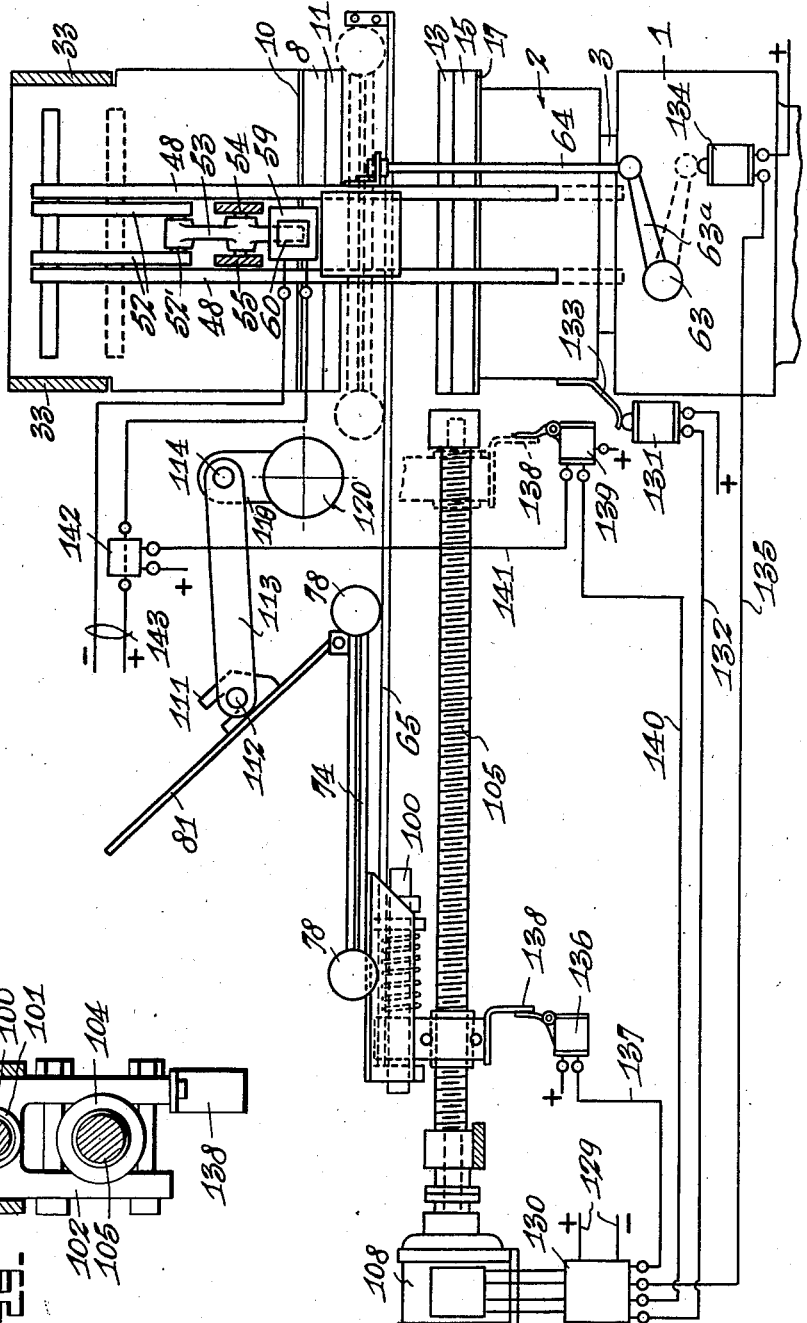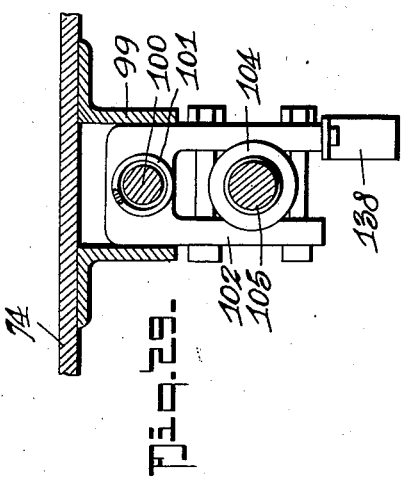

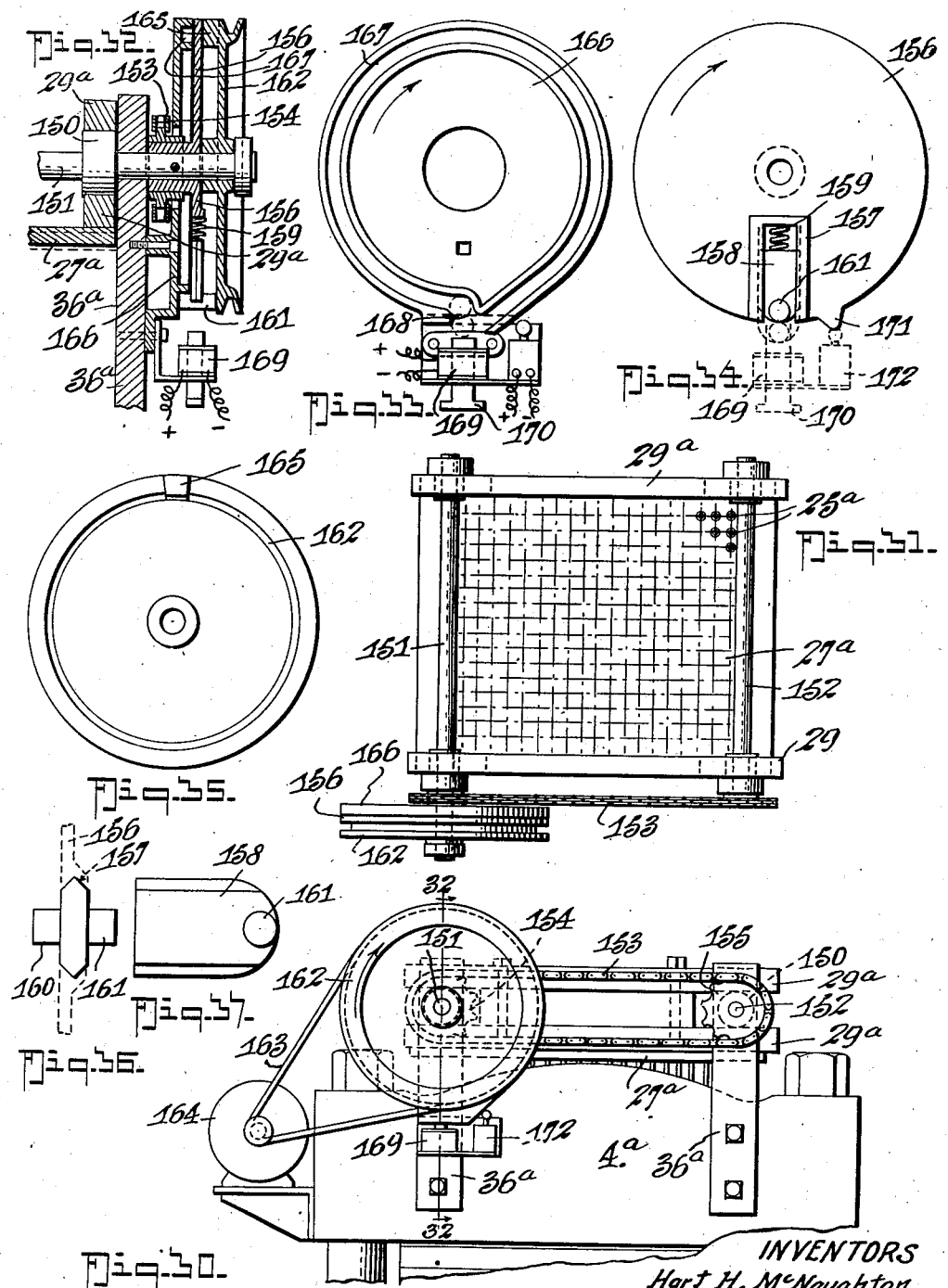

Patented May 2, 1944

2,347,972

UNITED STATES PATENT OFFICE 2,347,972

BUTTON MOLDING APPARATUS

Alexander A. Scott, Jr., and Hart H. McNaughton, Knoxville, Tenn., assignors to The Patent Button Company of Tennessee, Knoxville, Tenn., a corporation of Tennessee Application January 7, 1941, Serial No. 373,506

27 Claims. (Cl. 18—16)

This invention relates to an improvement in molding presses, and more particularly to the type of hydraulic presses used for the molding of buttons and like small objects of plastic material that is adapted to be shaped in a mold. This invention is an improvement on the Button making machine set forth in the patent of Alexander A. Scott, Jr., No. 2,133,906, granted October 18, 1938.

The molding press set forth in said patent was provided with a plurality of molds, each adapted to receive a pill of plastic material to be placed between the mold parts for shaping and molding the same under the pressure of the hydraulic press. After separation of the mold parts, the buttons were retained in the top mold parts, and provision was made for ejecting the buttons therefrom onto a receiving assembly that was inserted manually between the mold parts, after separation, for removal therefrom by the operator and for subsequent discharge into a receptacle.

The object of this invention is to improve the operation of the press and the molding and removal of the buttons therefrom, to provide substantially for automatic action thereof not only in the control of the press, but also in the ejection of the buttons from the mold parts, the punching out of the flash fins in the holes thereof, the dumping or removal of the buttons, and the brushing out of the mold parts, leaving the latter clean and ready for refilling.

In carrying out this object, we have provided mechanism associated with the press which is operated automatically in response to the separation of the mold parts thereof, for introducing a receiving tray assembly between the mold parts, onto which the buttons are deposited by the ejecting mechanism, which functions automatically without the necessity for manual control and actuation by the operator.

Provision is made also for the removal of the receiving assembly by power means, and for the automatic discharge of the buttons from the receiving assembly into a receiving receptacle adjacent the machine ready for subsequent operations. These mechanisms are so associated with the molding press as to be substantially automatic in action and to relieve the operator from the necessity of accomplishing the several operations by hand, thereby enabling one operator to superintend the action of several molding presses.

A preferred embodiment of the invention, together with a modification thereof, are illustrated in the accompanying drawings, in which:

Fig. 1 is a side elevation of a hydraulic molding press showing the invention applied thereto;

Fig. 2 is a detail longitudinal section of the receiving tray assembly and associated parts in dumping position;

Fig. 3 is a longitudinal sectional view through a portion of the press and receiving tray assembly;

Fig. 4 is a detail sectional view of a portion of the tray operating mechanism;

Fig. 5 is a vertical cross section through the press and receiving tray assembly therein;

Fig. 6 is a vertical section through a bottom mold part with a plastic pill thereon;

Fig. 7 is an enlarged vertical section through a mold, showing the ejecting pin and its support;

Fig. 8 is a vertical section through a unit of the receiving assembly in its relation to the upper mold part;

Fig. 9 is a similar view of the receiving assembly unit associated with a depressing roller;

Fig. 10 is a detail section through the receiving assembly unit, showing the stripping of a button therefrom;

Fig. 11 is a side elevation of the receiving tray assembly detached;

Fig. 12 is a partial sectional view therethrough;

Fig. 13 is a detail end view of a portion of the receiving assembly;

Fig. 14 is a partial plan view thereof;

Fig. 15 is a detail sectional view on the line 15—15 of Fig. 11;

Fig. 16 is a similar view on the line 16—16 of Fig. 14;

Fig. 17 is a top plan view of the receiving tray assembly and associated parts;

Fig. 18 is a detail sectional view of the pressure roll mounting;

Fig. 19 is a similar view of a suspending mounting therefor, on the line 19—19 of Fig. 17;

Fig. 20 is a detail end elevation thereof;

Fig. 21 is a detail top plan view of a portion of the brush mounting, with parts broken away;

Fig. 22 is a detail cross section thereof on the line 22—22 of Fig. 21;

Fig. 23 is a side elevation, partly in section, of the cleaning brushes;

Fig. 24 is a top plan view of the ejecting mechanism;

Fig. 25 is a side elevation at right angles to Fig. 1, partly in section, of the molding press and portion of the ejecting mechanism;

Fig. 26 is a vertical section, partly in elevation, on the line 26—26 of Fig. 25, of the ejecting mechanism, with parts of the press broken away and omitted for clearness of illustration;

Fig. 27 is a detail vertical section through a support for the ejecting mechanism, on the line 27—27 of Fig. 25;

Fig. 28 is a diagrammatic view showing the electrical control for the button removing mechanisms associated with the press;

Fig. 29 is a detail cross section through a portion of the receiving assembly drive, on the line 29—29 of Fig. 4;

Fig. 30 is a side elevation of the upper portion of the press, showing a modified form of ejecting mechanism;

Fig. 31 is a top plan view thereof;

Fig. 32 is a vertical sectional view through the control wheels thereof, on the line 32—32 of Fig. 30;

Fig. 33 is a side elevation of the cam disc thereof;

Fig. 34 is a similar view of the slide disc thereof;

Fig. 35 is a similar view of the pulley thereof;

Fig. 36 is an end view of the slide, detached; and

Fig. 37 is a side elevation thereof.

The present invention is shown as applied to a hydraulic press of conventional form, preferably of the type designed for automatic control, at least of the movable platen. In some views, parts have been broken away, omitted, or shown in dotted lines for clearness of illustration.

As shown in Fig. 1, the press has a base 1, above which is supported a movable platen 2 adapted to support the lower mold parts, and said platen 2 is carried by a hydraulic ram 3. The stationary frame constituting the fixed platen is shown at 4, provided with the usual ribs 5 therein (Fig. 5), and connected with the base 1 by stress rods 6 which serve to support the same in fixed relation and to form guides for the platen 2, the latter being provided with yokes 7 thereon embracing the stress rods, as is evident from Figs. 1 and 25.

As shown in Fig. 3, the top frame 4 constituting the stationary platen, has secured to the under side thereof the usual hot plate 8, with its steam passages 9 therein and insulated therefrom at 10. Secured to the under side of the hot plate 8 is a mold plate 11 provided with a multiplicity of orifices 12 therein, each adapted to receive an upper mold part, as hereinafter described.

A corresponding lower mold plate is shown at 13 having mold receiving orifices 14 therein, which mold plate 13 is mounted upon the lower hot plate 15, having steam passages 16 therein. The lower hot plate 15 is supported upon the lower platen 2, with insulation 17 therebetween.

The mold plates 11 and 13 support a multiplicity of molds therebetween, one for each button or other product to be molded, each mold being formed of upper and lower separable sections or parts 18 and 19 respectively received and fixed in the respective orifices 12 and 14 of the upper and lower mold plates 11 and 13, as shown more clearly in Fig. 7. The mold parts 18 and 19 are provided with cooperating cavities therein properly formed to provide the required shape for the buttons, and each having opposed aligned pins 20 and 21 in the cavities of a size and number corresponding with the holes to be formed thereby in the buttons. The upper mold pins 20 have peripheral notches or grooves 22 therein to retain the buttons in the upper mold parts after separation thereof until the buttons are ejected therefrom.

With the mold plates 11 and 13 separated from each other by the dropping of the lower platen 2 on the ram 3, the molding material may be introduced between the upper and lower mold parts, in the manner shown in Fig. 6. As illustrated, the molding material, in the form of pills P, one for each mold, is introduced between the mold parts 18 and 19. Each pill P is placed on the lower mold part 19 substantially centrally of the cavity therein where it rests on the pins 21. Then when the ram 3 is actuated to force the platen 2 upwardly, the mold parts 18 and 19 are brought together, as shown in Fig. 7, under heat and pressure sufficient to expand the pill P substantially to fill the cavities in the mold parts and thus form a button B therein.

The mold parts remain in their closed positions long enough to set or harden the material, after which they are separated by the lowering of the ram 3 which moves the lower parts of the molds downward, leaving the formed buttons B retained in the upper mold parts 18 by the engagement of the molded material in the notches or grooves 22 formed in the pins 20. The buttons are thus retained in the upper mold parts ready for removal by the ejecting mechanism and receiving assembly, as hereinafter described.

*Button ejecting mechanism*

For ejecting the formed buttons from the upper mold parts, we utilize preferably ejecting pins 23 adapted for sliding movement through orifices 24 in the upper mold parts 18, one pin being provided for each mold. The pins 23 are supported on rods 25 extending upwardly through the top frame 4, as shown in Figs. 3 and 5.

The upper end portion of each rod 25 is screw-threaded through an adjusting bearing 26 (Fig. 7) which is screw-threaded into a supporting plate 27, whereby proper adjustment may be made to locate the lower end of the pin 23 directly at the bottom of the cavity in the top mold part ready to eject the formed button therefrom, and the rod may be readily removed for replacement or repair by the removal of the adjusting bearing 26 from the supporting plate 27. A lock nut 28 may be provided on the upper end of the rod 25 to hold the same in its adjusted position in the bearing 26. This structure corresponds substantially with that set forth in Scott patent, No. 2,133,906, referred to above.

The supporting plate 27 is rigidly secured at its opposite edges to lower guide bars 29, as shown in Figs. 5, 24 and 27, which guide bars 29 are spaced from upper guide bars 30 by blocks 31, and secured in spaced relation by bolts 32, providing spaces between the guide bars adjacent opposite ends thereof forming slideways, as hereinafter described.

The guide bars 29 and 30 are mounted within a surrounding frame formed by side plates 33 and end plates 34 within which the guide bars 29 and 30 are vertically movable, being confined at their opposite ends between one of the end plates 34 (at the left in Fig. 5) and thrust blocks 35 spaced inwardly from the opposite end wall, whereby the guide bars may slide vertically in the frame 33—34 but are confined against endwise movement relative to the frame. The frame is supported at opposite sides by upstanding supports 36 (Figs. 3, 24 and 25) which are rigidly secured to the side plates 33 and to the top frame 4 of the press.

Extending transversely of the frame 33—34 are spaced parallel shafts 37 and 38 (Fig. 5) the opposite ends of which are supported by the side plates 33. Pairs of links 39 and 40 are pivotally supported by the respective shafts 37 and 38 and extend downwardly therefrom, suspending shafts 41 and 42 on the lower ends thereof respectively. The shafts 41 and 42 project laterally at opposite ends beyond the links 39 and 40, as shown in Fig. 27, and have bearings 43 on the outer ends thereof slidably received in the slideways formed by the guide bars 29 and 30, supporting thereon said guide bars and the supporting plate 27 and ejecting rods suspended therebeneath. The shafts 41 and 42 are connected together by connecting bars 42' which extend therebetween for joint swinging movement of the shafts on the links 39—40.

The shaft 42 is connected with one end of each of a pair of thrust toggles 44, the opposite ends of which are connected with a pivot shaft 45. Said pivot shaft connects the thrust toggles 44 with swinging toggles 46 pivotally supported on a shaft 47 mounted in the opposite side plates 33 of the surrounding frame.

The pivot shaft 45 is free for bodily movement vertically and longitudinally of the frame 33—34, but is supported by lifting bars 48 connected with spaced portions thereof, as shown in Figs. 24 to 26. Said lifting bars extend downwardly beside the mold plates 11 and 13, and have the lower ends thereof slotted at 49 (Fig. 25) to receive a lifting pin 50 secured by a bracket 51 to the movable platen 2. This provides a lost motion connection between the movable platen and the lifting bars 48, but the length of the slots 49 is such that the pin 50 will engage and cause a lifting movement of the bars 48 just before the mold parts are moved together, to raise the toggle mechanism to its set position, as shown in Fig. 5, with the ejecting pins 23 in their raised positions as shown in Fig. 7. This is accomplished by moving the toggles 44—46 from their dotted line positions in Fig. 5 to their full line positions therein.

For supporting the toggles in their raised positions when the mold parts are separated, I have provided also a supporting toggle connected with the pivot shaft 45, comprising depending links 52 extending downward therefrom and having their lower ends pivotally connected at 52' with a locking member 53. The locking member 53 is pivotally supported at 54 between bracket arms 55 which extend outwardly from and are rigidly secured to a bracket 56 attached to the top frame 4, as shown in Figs. 5 and 25. The outer ends of the bracket arms 55 are carried by a stirrup frame 57 suspended from the frame 33—34.

When the depending links 52 are raised by the lifting bars 48, they are in the full line position shown in Fig. 5, where they rest against an abutment 58, being held in this position by the weight applied thereby to the locking member 53, the center of the pivot 52' being then at the left of the center of the pivot 54 in Fig. 5, where the parts are thus retained until the locking member 53 is tripped to the dotted line position therein to allow the ejecting mechanism to be lowered.

For this purpose, a solenoid 59 is provided having a thrust armature 60 in position to bear against the free end of the locking member 53 to trip the same. When the solenoid 59 is energized, the armature 60 is moved to the left in Fig. 5 to swing the locking member 53, so as to move the pivot 52' to the right of the center of the pivot 54, when the supported weight thereon will continue the movement thereof quickly with a snap action, substantially to the dotted line position, during which movement the ejecting mechanism will be lowered to discharge the buttons from the molds, as will be described hereafter. The solenoid 59 is mounted on a bracket 61 suspended from the stirrup frame 57.

The lifting bars 48 may be provided, if desired, with a weight 62 to assist in the quick dropping of the ejecting mechanism, and are also shown as connected with a shock absorber 63 through an arm 63a and a link 64 to cushion the dropping action of the ejecting mechanism and to prevent breakage of the ejecting pins or other parts of the mechanism. The shock absorber 63 may be of any suitable construction as desired, such as a coiled spring or hydraulic device, which will cushion the thrust imposed by the dropping action.

*Button receiving assembly*

As shown in Fig. 1, the press has a pair of trackways 65 extending transversely therethrough, which trackways are spaced apart on opposite sides of the mold plates 11 and 13, as shown in Figs. 5 and 25, to permit vertical movement of the bottom mold plate therebetween.

At their forward ends, the trackways 65 are provided with a transverse stop 66 (Fig. 1), and are supported on brackets 67 suspended from the top frame 4. The opposite or rearward ends of the trackways 65 are mounted on supporting legs 68 and are also supported intermediate the ends thereof on vertical side plates 69, which have the lower ends thereof secured by brackets 70 to a side of the base 1, and having the upper ends thereof secured by brackets 71 to a side of the top frame 4.

Extending parallel with the trackways 65 and beneath the latter is a supporting frame having side plates 72 supported at their forward ends by the vertical plates 69, and at their rearward ends by the legs 68, to which they are secured respectively. The rearward ends of the side plates 72 are connected together by cross bars 73, extending beside and transversely between the legs 68, as shown in Figs. 1 and 4.

Adapted for movement on the trackways 65 is a receiving tray assembly shown in Figs. 3, 5 and 11 to 16, inclusive, adapted to receive the buttons as they are ejected from the upper mold parts 18, to remove the same from the press.

This receiving assembly is constructed of a base plate 74 having bearing blocks 75 mounted thereon. The bearing blocks 75 are provided with anti-friction bearings 76 therein (Figs. 15 and 16), in which are journaled axles 77, having wheels 78 mounted on the outer ends thereof. The axles 77 extend transversely of opposite ends of the base plate 74 and the wheels 76 are mounted on the trackways 65, as shown in Figs. 2 and 5, for supporting the receiving assembly thereon and for moving the same along the trackways.

Supported on the base plate 74 and resting thereon, is a pin plate 79 (Fig. 3) having a multiplicity of pins 80 upstanding therefrom. The pins 80 are arranged in groups or units to correspond substantially in size and position with the holes of the multiplicity of buttons to be molded in the press, there being two or four pins to each button, according to the number of holes formed thereon.

Superimposed on the pin plate 79 is a stripping plate 81 having orifices therein of a size and position to register with and receive the pins 80 therethrough and slidably interfit therewith. The pins 80 are of a length to extend above the upper surface of the stripping plate 81 when the latter is seated directly on the pin plate 79, as shown in Fig. 8, but the stripping plate is adapted for movement above the pins, as shown in Fig. 10, to strip the buttons therefrom.

Extending downwardly from the under side of the base plate 74 and secured thereto are L-shaped supporting blocks 82 (Fig. 12) for supporting an under-carriage frame, said blocks having portions underlying cross ties 83 connected at opposite ends with side bars 84 of said undercarriage and through which said under-carriage may be suspended from the base plate 74.

The under-carriage supports at one end thereof, a pair of upstanding hinge posts 85 secured at their lower ends to the side bars 84 by bolts 86, and the upper ends of the posts 85 pivotally receive trunnions 87 extending in opposite directions from one end of the stripping plate 81, to form a pivotal support for said stripping plate on the posts 85, mounting the same on the undercarriage. The free edge of the stripping plate 81 rests upon supporting posts 88 attached by bolts 89 to the side bars 84 of the under-carriage.

Although the under-carriage is supported by the L-shaped blocks 82 from the base plate 74 in the position shown in Fig. 12, it is free to move vertically relative thereto to move the stripping plate 81 upwardly relative to the pins supported by the base plate 74, to strip the buttons from the pins. To accomplish this result, rollers 90 are journaled on the connecting bolts 86 and 89 in positions to engage and ride up on inclined portions of cams 91, secured to the inner faces of the side plates 72, as shown in Figs. 1 to 3. The inclined portions of the cams 91 push upward on the under-carriage, lifting it free from the supporting blocks 82 and raising the posts 85 and 88 relative to the base plate 74, thereby raising the stripping plate 81 to a point above the pins 80, substantially as shown in Fig. 10, thus leaving the buttons free on the upper surface of the stripping plate for ready removal therefrom.

As shown in Figs. 3 and 21 to 23, the base plate 74 of the receiving assembly, has secured to one end of the under surface thereof, clamps 92 receiving the inner ends of brush rods 93 which are adapted to be clamped in place by clamping screws 94, as shown in Fig. 22.

The outer end of each brush rod 93 has fixed thereon a pair of adjusting links 95, between which extend plate blocks 96, the opposite ends of which are journaled in the adjusting links 95 for turning movement relative thereto. Brush plates 97 are secured rigidly to the plate blocks 96, and have brushes 98 mounted thereon, as shown in Fig. 23. The adjusting links 95 form parallel links between the pair of brushes for supporting them and for relative inward and outward movement upon the rotation of the brush rods 93. The clamps 92 may be loosened for this purpose and then retightened by the clamping screws 94 for the adjustment of the brushes. This adjustment may be necessary to take up for wear of the brushes, to obtain proper brushing action of the molds.

The brushes 98 should be adjusted the proper distance apart for brushing out the mold parts when the receiving assembly moves out of the press with the ejected buttons thereon, to remove from the molds particles of plastic material, flash parts, etc., leaving the molds clean for subsequent operation.

We have provided a power driving connection for moving the receiving tray assembly into and out of the space between separated mold parts, as shown in Figs. 1, 3, 4, and 28. A frame 99 is fixed to the under side of the base plate 74, which frame is substantially as shown in Fig. 14, and slidably receives therein a rod 100 (Fig. 4). A spring 101 is sleeved over the rod 100 and is interposed between one end of the frame 99 and a bracket 102 fixed on the rod 100. A stop 103 is also fixed on the rod externally of the frame for limiting the sliding movement of the rod in one direction. The spring 101 forms a cushioned connection between the bracket 102 and the base plate 74 of the receiving tray assembly.

The bracket 102 extends downwardly from the underside of the base plate 74 (Fig. 29) and has secured therein a nut 104 receiving and threaded on a power screw 105. The screw 105 has its forward end journaled in bearings 106 (Fig. 3) carried by the side plates 69, while its rearward end is journaled in bearings 107 supported on the under cross bar 73. The screw is externally screw-threaded throughout its length, and through its threaded connection with the nut 104 attached to the bracket 102 rotation of the screw causes sliding movement of the button receiving tray assembly lengthwise of the trackways 65 into and out of the space between separated mold parts.

As shown in Figs. 1 and 28, the screw 105 is driven from an electric motor 108 having a direct coupled connection 109 between the armature shaft thereof and the screw. The motor 108 is mounted on a bracket 110 supported by the legs 68 of the frame.

The button stripping plate 81 has dump blocks 111 fixed to the upper side thereof, each constructed of hook shape, as shown in Fig. 3. The blocks 111 are adapted to engage a dump shaft 112 suspended by pivot links 113 from a pivot shaft 114 supported in the upstanding side plates 69. The dump shaft 112 is held normally in position to be engaged by the dump blocks 111, by upstanding supports 115 (Fig. 1), so that upon outward movement of the receiving assembly from between separated mold parts, said dump blocks engage the shaft after the stripping plate 81 has lifted the buttons off the pins as shown in Figs. 3, and further movement of the tray causes the stripping plate to be raised to the position shown in Fig. 2, sliding the buttons off the tray into a hopper 116 (Fig. 1) mounted between the side plates 72, which hopper 116 directs them into a receptacle 117 disposed beneath the frame structure.

The pivot shaft 114 extends between upright side supporting plates 69, in which it is mounted, and has suspended therefrom not only the pivot links 113, but also roll supporting links 118, which are held in spaced relation by a sleeve 119 on which said links 118 are fixed, as shown in Figs. 17 and 19.

The lower ends of the links 118 support a press roll 120 that is fixed on a shaft 121 journaled in bearings 122 in the links 118 for free turning movement relative thereto. The press roll 120 has a covering 123 of relatively soft rubber or rubber-like material for engaging the buttons as they are drawn out from the molds resting on the pins 80, as shown in Fig. 8, to press the buttons down on the pins, as shown in Fig. 9, and thereby to clean out the holes in the buttons by removing the flash fins which are left in the holes at the points of juncture of the mold parts.

At opposite ends, the pivot shaft 114 is provided with an eccentric extension 124 and 124', the former of which is shown in Figs. 19 and 20, as squared and mounted in an eccentric adjustment disc 125 journaled in a side plate 69 for turning movement relative thereto to vary the height of the center of the main body of the shaft 114, and thereby raise or lower the roll 120 suspended therefrom, so as to apply the proper and required pressure to the buttons as they are withdrawn from the molds. The end portion 124' is journaled in the adjacent vertical side plate 69 coaxial with the eccentric disc 125, to turn therewith for uniformly raising and lowering said body portion of the shaft 114. The adjustment disc 125 has an arcuate slot 126 therein receiving a clamping screw 127 that is connected with the side plate 69 for locking the adjustment disc 125 in an adjusted position.

Rearward swinging movement of the roll supporting links 118 is limited by abutments 128 (Fig. 3) extending inwardly from the side plates 69.

*Control system*

The electric control for the press is shown diagrammatically in Fig. 28, in which a power line 129 supplies current to the electric motor 108 through a control switch 130. The control switch 130 is adapted to be controlled from a series of limit switches operative in response to various conditions of the press, one of which is shown at 131 connected through a line 132 with the control switch 130, and operated by an arm 133 attached to a side of the bottom platen 2, whereby the lowering thereof closes the switch 131 to operate the control switch 130 to supply current to the motor 108.

A second limit switch is shown at 134 in position to be closed by the arm 63a of shock absorber 63 when the ejecting pins have been moved downward to eject the buttons from the upper mold parts. The limit switch 134 is connected through a line 135 with the control switch 130 to reverse the motor and withdraw the receiving tray from the press. The motor is stopped in this withdrawing movement by a limit switch 136 connected through a line 137 with the control switch 130 which limit switch 136 is actuated by an arm 138 attached to the under side of the bracket 102.

The forward movement of the receiving tray into the press by the motor is stopped by a limit switch 139 connected through a line 140 with the control switch 130, which limit switch 139 is actuated by the arm 138 as indicated in dotted lines in Fig. 28. The limit switch 139 is also connected through a line 141 with a switch 142 in a power line 143, leading to the solenoid 59 to cause energizing of the solenoid and actuation of the ejecting mechanism after the tray has been moved into the press.

The control switch 130, and the several limit switches described are of conventional construction, well-known in the art and need not be illustrated in detail. Only one electric line is shown to each of the limit switches, the opposite side being grounded to the frame.

*Operation*

In molding buttons or similar products from synthetic gum resins or the like, the molding requires substantial heat and pressure maintained a sufficient length of time for the setting of the resinous material. The raw resinous material in the shape of small pellets P, is introduced into the molds when the mold parts are separated from each other in the relation shown in Fig. 3. Each of the pellets should be of a size to accommodate one mold, and is placed on the pins 21 of the bottom mold part 19, when the bottom platen 2 is in its lowermost position. This may be accomplished manually by the operator or in any other suitable way; and the ram 3 is then operated in the usual manner to force the mold sections together under sufficient heat and pressure to accomplish the molding action.

After the buttons have become set in the molds or hardened to the desired extent, as indicated in Fig. 7, the molds may be opened for the removal of the buttons. This is accomplished by the lowering of the ram 3 which moves the bottom mold sections downward, leaving the buttons adhering to the upper mold parts 18 due to the notches 22 in the pins thereof which retain the buttons in place therein until they are positively ejected.

When the ram reaches the limit of its downward movement, the arm 133 (Fig. 28) carried thereby, engages and closes the limit switch 131 to close a circuit through the line 132 to the control switch 130, operating the latter to connect the motor 108 with the power line 129, causing operation of the motor to rotate the screw 105 in a forward direction.

This moves the receiving assembly forward from the full line position in Fig. 28 to the dotted line position therein, wherein it is disposed in the press between the mold parts, ready to receive the buttons from the upper mold parts. The pins 80 of the receiving assembly are arranged so as to be disposed in direct alignment with the pins 20 of the upper mold parts when the receiving assembly is in its proper position in the press, and with the upper ends of the pins 80 spaced relatively close to the lower ends of the pins 20, as shown in Fig. 8. At this time, the pins project above the stripping plate 81, since the latter is in its lowermost position, the under-carriage that supports the stripping plate being suspended on the L-shaped brackets 82 from the base plate 74.

When the receiving assembly moves to its receiving position in the press, the arm 138 engages and actuates the contact arm of limit switch 139 to close a circuit through line 140 to the control switch 130 for opening the latter and deenergizing the electric motor 108. This stops the operation of the power screw 105 with the receiving assembly in its receiving position, as described.

The closing of the limit switch 139 also closes a circuit through the line 141 to a control switch 142 in the power line 143 for supplying current to the solenoid 59 to energize the latter. The ejecting rods 25 are initially set in the positions shown in Figs. 5 and 7, the supporting plate 27 being raised and held in its raised position by the inclined position of the links 39 and 40 and the angular relation of the toggle links 44 and 46. These toggle links are held in such angular position by being supported on the supporting links 52 and lever 53 due to the off-center relation of the pivots 52' and 54.

However, when the solenoid 59 is energized, it draws inward on its core armature 60 to swing the lever 53 on its pivot 54, moving said lever from its full line position in Fig. 5 to its dotted line position therein, this being accomplished with a quick motion when the pivot 52 has moved past the dead center of the pivot 54, due to the superposed weight thereon. This shifting of the lever 53 swings the toggle links first to a straightened and then to a lower angular position, as shown in dotted lines in Fig. 5. The straightening of the toggle links 44, 46, causes downward swinging movement of the links 39, 40, pressing downward on the supporting plate 27 and the ejecting rods 25. The pressure of the pins 23 (Fig. 7) on the buttons in the upper mold parts is sufficient to break the connections with the notches 22, allowing the buttons to drop onto the pins 80 of the receiving assembly in the positions shown in Fig. 8.

When the lever 53 is thus tripped by the solenoid 59, the downward movement of the supports 48 under the influence of the weight 62 acts against the shock absorber 63 to check the impact of the ejecting mechanism. The downward movement of the shock absorber arm 63a acts to close limit switch 134 (Fig. 28), closing a circuit through a line 135 to the control switch 130 through which the latter is closed to cause reverse movement of the motor 108, rotating the screw 105 in the reverse direction, thus withdrawing the receiving assembly from the press.

As the buttons move out of the press on pins 80, as shown in Fig. 8, they pass under pressure roll 120 which is suspended normally on the links 118 bearing against the abutments 128, as shown in Fig. 3. The position of the pressure roll 120 should be such as to press the buttons downward on the pins 80, as shown in Fig. 9, thereby breaking the flash fins which are left in the button holes by the molding operation, thus cleaning out the holes.

After the receiving assembly passes under the roller 120, the rollers 90 of the under-carriage engage and ride up on cams 91, which raise the under-carriage relative to the base plate 74, thus elevating the posts 85 and 88, and lifting the stripping plate 81 to the position shown in Figs. 3 and 10, which lifts the buttons off the receiving pins 80, leaving them lying free on the stripping plate.

As the receiving assembly continues its withdrawing movement, it passes under the dump shaft 112 (Fig. 3) which is engaged by the blocks 111, so that as the receiving assembly continues to move back on the trackways by the power screw 105, the stripping plate 81 is caused to swing upward from the position shown in Figs. 1 and 3 to the position shown in Fig. 2, sliding the buttons off the stripping plate 81 into the hopper 116 for discharge into the receptacle 117, ready for the final finishing and polishing operations of the usual character.

As the receiving assembly reaches the limit of its withdrawing movement and discharges the buttons therefrom, as shown in full lines in Fig. 28, the arm 138 thereof engages and actuates the limit switch 136 to close a circuit through the line 137 to the control switch 130, opening the latter and stopping the motor 108.

During the withdrawing movement of the receiving assembly, the brushes 98 attached thereto are withdrawn also between the mold parts, brushing out the molds and cleaning them ready for a subsequent operation.

Thus the molding and removing of the finished products is controlled automatically by the operator who merely needs to fill the press with the molding material and to start the operation of the press in the usual way, the remainder of the operation resulting entirely automatically.

Modified power knock-out

In Figs. 30 to 37 is shown a modified form of knock-out device designed for operation of the pins which release and remove the molded buttons from the upper mold parts, dropping them onto the retaining pins 80. In place of the toggle mechanism described above, the supporting plate 27a of the pin assembly to which a multiplicity of pins 25a are attached, as shown in Fig. 31, is supported by upper and lower side bars 29a spaced apart and having guideways therebetween in which eccentrics 150 are mounted. The eccentrics are mounted on shafts 151 and 152, and are turned relative thereto, so that the high points of the eccentrics hold the plate 27a in its elevated position, and during one revolution of the eccentrics, the knock-out pins 25a are forced down to eject the buttons from the upper mold parts. The shafts 151 and 152 are connected together by a sprocket chain 153, passing over a sprocket wheel 154 on the shaft 151, and a sprocket wheel 155 on the shaft 152.

As shown in Fig. 32, the sprocket wheel 154 is fixed to the hub of a wheel 156 that is pinned on the shaft 151, which wheel is shown in Fig. 34. The wheel 156 has a radial guideway 157 therein slidably receiving a slide 158 mounted therein and normally pressed outward relative to the wheel by a spring 159 interposed between the end of the guideway 157 and the slide 158. The outer end of the slide 158 is formed with laterally projecting pins 160 and 161 (Figs. 36–37).

Rotatably mounted on the outer end of the shaft 151 for turning movement relative thereto is a driving wheel 162 connected by a belt 163 with an electric motor 164. The driving wheel 162 has on the inner edge thereof at its periphery, a laterally projecting lug 165 in position to engage the pin 161 when the slide 158 is in the position shown in Figs. 32 and 34.

On the opposite side of the wheel 156 is a fixed plate 166 having a cam groove 167 therein (Fig. 33) having an entrance mouth 168 at the bottom of the plate directly over a solenoid 169 adapted to be connected with the limit switch 139 of Fig. 8, so as to be energized when the receiving assembly has been moved into the press.

When the solenoid 169 is energized, it starts the knock-out cycle by drawing up on its armature 170, and moving the slide 158 into the mouth 168 in the upper dotted line position in Fig. 33. This positions the pin 161 in the path of the lug 165 during the operation of the driving wheel 162 by the motor 164, so that rotation of the driving wheel will cause turning movement of the wheel 156 through one revolution at the end of which the cam 167 will move the slide 158 to its dotted line position in Fig. 34, with the pin 161 moved out of the path of the lug 165, thus stopping the rotation of the shafts 151 and 152. The cam plate 166 is supported on a side of one of the supports 36a that carry the shafts 151 and 152 above the frame 4a.

The wheel 156 has a radial projection 171 on the periphery thereof in position to engage and operate a limit switch 172 for timing the withdrawal of the receiving tray assembly with its load of buttons thereon.

As the shafts 151 and 152 are turned through one revolution, the eccentrics 150 thereon lower and raise the knock-out assembly carrying the rods 25a, thereby ejecting the buttons from the upper mold parts.

We claim:

1. A process of making products comprising molding an article from a plastic material capable of being hardened and simultaneously with said molding thereof forming a hole therein with a web in said hole, ejecting said article after hardening from the mold onto an impaling prong of substantially the same size as the hole with the web resting on the prong, removing the article on the prong from proximity to the mold, and thereafter further impaling the article on the prong removing the web from the hole.

2. A process of making products comprising molding an article from a plastic material capable of being hardened and simultaneously with said molding thereof forming a hole therein with a web in said hole, ejecting said article after hardening from the mold onto an impaling prong of substantially the same size as the hole with the web resting on the prong, removing the article on the prong from proximity to the mold, and thereafter further impaling the article on the prong by forcing the prong through the hole breaking out and removing the web therefrom.

3. A process of making buttons comprising molding a button between cooperating separable mold parts from a plastic material capable of being hardened and simultaneously with said molding thereof forming holes therein with webs in said holes, retaining the button in one of the mold parts after separation thereof, ejecting the button after hardening from said mold part onto impaling prongs of substantially the same size as the holes with the webs resting on the prongs, removing the button on the prongs from between the mold parts, thereafter further impaling the button on the prongs by forcing the prongs through the holes breaking out and removing the webs therefrom, and then removing the button from the prongs.

4. A process of making products comprising molding an article from a plastic material capable of being hardened and simultaneously with said molding thereof forming a hole therein with a web in said hole, ejecting said article from the mold after hardening onto an impaling prong of substantially the same size as the hole with the web resting on the prong, conveying said article from proximity to the mold while the article is supported by the web resting on the prong, and thereafter further impaling the article on the prong removing the web from the hole.

5. In article molding apparatus, the combination of coacting separable mold parts adapted to mold an article therebetween, one of the mold parts being constructed to retain the article thereon after separation, means for ejecting the article from said mold part, a receiving device, means for moving said receiving device into a receiving position adjacent said mold part, and means actuated automatically in response to movement of the receiving device to said receiving position for actuating the ejecting means.

6. In article molding apparatus, the combination of coacting separable mold parts adapted to mold an article therebetween, one of the mold parts being constructed to retain the article therein after separation, means for ejecting the article from said mold part, a receiving device, means for moving said receiving device into a receiving position adjacent said mold part, means actuated automatically in response to movement of the receiving device to said receiving position for actuating the ejecting means to eject the article from said mold part onto the receiving device, and means for automatically removing the receiving device after operation of the ejecting means.

7. In article molding apparatus, the combination of coacting separable mold parts adapted to mold an article therebetween, one of the mold parts being constructed to retain the article therein after separation and having an opening therein, an ejector rod arranged to be projected through said opening to remove the molded article from said mold part, a receiving device, means for moving said receiving device into a receiving position adjacent said mold part, and means for actuating said ejector rod automatically in response to movement of the receiving device into said receiving position.

8. In article molding apparatus, the combination of coacting separable mold parts adapted to mold an article therebetween, one of the mold parts being constructed to retain the article therein after separation and having an opening therein, an ejector rod extending upwardly through said opening and arranged to be projected therethrough to remove the molded article from said mold part, a support for said rod, means mounting said support for down and up movement to eject the product from said mold part, operating means for said support, a receiving device, means for moving said receiving device into a receiving position adjacent said mold part, and means for automatically actuating said support operating means in response to movement of the receiving device into said receiving position.

9. In article molding apparatus, the combination of coacting separable mold parts adapted to mold an article therebetween, one of the mold parts being constructed to retain the article therein after separation, and having an opening therein, an ejector rod extending upwardly through said opening and arranged to be projected therethrough to remove the molded article from said mold part, a support for said rod, means for guiding said support for up and down movement of the support relative to said guiding means, means connected with said support and constructed for turning movement relative thereto for lowering and raising the support to eject the product from the mold part, a receiving device for the product, means for moving said receiving device into a receiving position adjacent the mold part, and means for automatically actuating the lowering and raising means upon movement of the receiving device into said receiving position, said actuating means including an electro-magnet operatively connected with the lowering and raising means and a limit switch electrically connected therewith and arranged in position for actuation by the receiving device in receiving position.

10. In article molding apparatus, the combination of coacting separable mold parts adapted to mold an article therebetween, one of the mold parts being constructed to retain the article thereon after separation, means for ejecting the article from said mold part, a receiving device, means for moving said receiving device into a receiving position adjacent said mold part, and means actuated by the receiving device in said receiving position for actuating the ejecting means.

11. In article molding apparatus, the combination of coacting separable mold parts adapted to mold an article therebetween, one of the mold parts being constructed to retain the article thereon after separation, means extending upwardly relative to said mold part for ejecting the article therefrom, said ejecting means having a transverse slot, a guide in said slot movable relative thereto and constructed for moving the ejecting means down and up, and means for actuating said guide including toggle mechanism, and electro-magnetic means for actuating said toggle mechanism.

12. In article molding apparatus, the combination of coacting separable mold parts adapted to mold an article therebetween, one of the mold parts being constructed to retain the article therein after separation, means extending upwardly relative to said mold part for ejecting the article therefrom, said ejecting means having a transverse slot, a guide in said slot movable relative thereto and constructed for moving the ejecting means down and up, means for actuating said guide including toggle mechanism connected with the guide, a latch connected with the toggle mechanism for holding the same in a set position, and an electro-magnet associated with the latch for releasing the same for actuation of the ejecting means.

13. In article molding apparatus, the combination of separable mold parts adapted to mold an article therebetween, a receiving device for the article having means for engaging and holding the article thereon, guides supporting said receiving device thereon for movement to a receiving position between separated mold parts, a bracket having lost-motion connection with said receiving device and having a nut connected therewith, a power screw having screw-threaded connection with said nut, and power means for driving said screw.

14. In article molding apparatus, the combination of separable mold parts adapted to mold an article therebetween, a receiving device for the article having means for engaging and holding the article thereon, guides supporting said receiving device thereon for movement to a receiving position between separated mold parts, means for withdrawing said receiving device on the guides from said receiving position, means on said receiving device and movable upwardly relative thereto for releasing the article from the engaging and holding means, and cam means associated with the guides in position to raise said releasing means upon the withdrawal of the receiving device from said receiving position.

15. A receiving device for the withdrawal of a perforated article from a molding press, comprising a trolley structure having a support thereon with an upstanding prong for receiving the article thereon, an under-carriage carried by said trolley structure and movable vertically relative thereto, and a plate pivotally connected with said under carriage in position to engage under the article on the prong to lift said article therefrom.

16. In article molding apparatus, the combination of separable mold parts adapted to mold a perforated article therebetween with a web in the perforation thereof, a receiving device removably disposed between separated mold parts, said receiving device having an impaling prong for supporting the article thereon by engagement with the web, means for guiding the withdrawal of the receiving device, and means spaced from the mold parts externally thereof for depressing the article on the prong to break the web and clean out the perforation thereof.

17. In article molding apparatus, the combination of separable mold parts adapted to mold a perforated article therebetween with a web in the perforation thereof, a receiving device removably disposed between separated mold parts, said receiving device having an impaling prong for supporting the article thereon by engagement with the web, means for guiding the withdrawal of the receiving device, means for depressing the article on the prong to break the web and clean out the perforation thereof, said depressing means including a roller in position to bear upon the article on the prong, and means supporting said roller for vertical adjustment relative to the receiving device.

18. A receiving device for a molded article having means for engaging and holding the article thereon, guides supporting said receiving device thereon for movement to a receiving position at which it is adapted to receive the article, means for withdrawing said receiving device on the guides from said receiving position, said receiving device having a support pivotally mounted thereon for swinging movement relative to the engaging and holding means, said support being in position to remove the article from said receiving device, and means for swinging said support relative to the engaging and holding means to discharge the article therefrom automatically upon withdrawal of said receiving device from receiving position.

19. In article molding apparatus, the combination of coacting separable mold parts adapted to mold an article therebetween, one of the mold parts being constructed to retain the article thereon after separation, means for ejecting the article from said mold part, a receiving device, means for moving said receiving device into a receiving position adjacent said mold part, and means responsive to the movement of the receiving device to said receiving position for actuating the ejecting means to eject the article from the mold part to the receiving device.

20. In article molding apparatus, the combination of coacting separable mold parts adapted to mold an article therebetween, one of the mold parts being constructed to retain the article thereon after separation, means for ejecting the article from said mold part, a receiving device, means for moving said receiving device into a receiving position adjacent said mold part, and means actuated by the receiving device upon movement to said receiving position for causing operation of the ejecting means.

21. In article molding apparatus, the combination of coacting separable mold parts adapted to mold an article therebetween, one of the mold parts being constructed to retain the article thereon after separation, means for ejecting the article from said mold part, a receiving device, means for moving said receiving device into a receiving position adjacent said mold part, means including electrical controlling means for operating the ejecting means, and switch means connected with the electrical controlling means and so constructed and arranged as to be closed in response to the movement of the receiving device to said receiving position for actuating the ejecting means.

22. In article molding apparatus, the combination of coacting separable mold parts adapted to mold an article therebetween, one of the mold parts being constructed to retain the article thereon after separation, means for ejecting the article therefrom, and means for actuating said ejecting means including toggle mechanism, and electro-magnetic means for actuating said toggle mechanism.

23. In article molding apparatus, the combination of coacting separable mold parts adapted to mold an article therebetween, one of the mold parts being constructed to retain the article thereon after separation, reciprocating means for ejecting the article therefrom, means for reciprocating said ejecting means including a rotatable device operatively connected with the ejecting means, power means for driving said rotatable device, and means forming a driving connection of said power means with said rotatable device through a predetermined cycle of operation thereof and constructed for disconnecting said driving connection therebetween after said cycle of operation.

24. In article molding apparatus, the combination of a molding structure having separable mold parts adapted to mold an article therebetween, trackways extending into the molding structure at opposite sides of the mold parts, a receiving device for the article mounted on the trackways for movement thereon to a receiving position between separated mold parts, electrically actuated power means for moving said receiving device to said receiving position, and a limit switch connected with said power means and arranged for actuation by the separation of the mold parts to actuate the power means.

25. In article molding apparatus, the combination of separable mold parts adapted to mold an article therebetween, a receiving device for the article, electrically actuated power means for moving said receiving device to a receiving position between separated mold parts, and switch means arranged for actuation in response to the separation of said mold parts for actuating the power means to move the receiving device to the receiving position.

26. In article molding apparatus, the combination of separable mold parts adapted to mold an article therebetween, a receiving device for the article, electrically actuated power means for moving said receiving device to a receiving position between separated mold parts, and switch means arranged for actuation in response to the separation of said mold parts for actuating the power means to move the receiving device to the receiving position, means for ejecting the article from one of the mold parts to the receiving device, and means for actuating said ejecting means automatically in response to movement of the receiving device to said receiving position.

27. In article molding apparatus, the combination of separable mold parts adapted to mold an article therebetween, a receiving device for the article, electrically actuated power means for moving said receiving device to a receiving position between separated mold parts, switch means arranged for actuation in response to the separation of said mold parts for actuating the power means to move the receiving device to the receiving position, means for ejecting the article from one of the mold parts to the receiving device, means for actuating said ejecting means automatically in response to movement of the receiving device to said receiving position, and means operated by the ejecting means for actuating the power means for withdrawing the receiving device from between the separated mold parts.

ALEXANDER A. SCOTT, Jr.
HART H. McNAUGHTON.